United States Patent
Chen

(10) Patent No.: US 8,718,659 B2
(45) Date of Patent: May 6, 2014

(54) METHOD OF RANDOM ACCESS CHANNEL OPTIMIZATION AND RELATED COMMUNICATION DEVICE

(75) Inventor: Te-Ming Chen, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 293 days.

(21) Appl. No.: 12/815,436

(22) Filed: Jun. 15, 2010

(65) Prior Publication Data
US 2010/0323710 A1 Dec. 23, 2010

Related U.S. Application Data

(60) Provisional application No. 61/218,428, filed on Jun. 19, 2009.

(51) Int. Cl.
*H04W 72/00* (2009.01)

(52) U.S. Cl.
USPC .................. 455/450; 455/422.1; 370/329

(58) Field of Classification Search
USPC .............. 455/450; 370/252, 253, 341–345
See application file for complete search history.

(56) References Cited

U.S. PATENT DOCUMENTS

| | | | |
|---|---|---|---|
| 2005/0266846 A1* | 12/2005 | Kim | 455/436 |
| 2009/0170441 A1* | 7/2009 | Eckert et al. | 455/67.11 |
| 2010/0034169 A1* | 2/2010 | Maheshwari et al. | 370/331 |

FOREIGN PATENT DOCUMENTS

| | | |
|---|---|---|
| WO | 2008084953 A1 | 7/2008 |
| WO | 2010105518 A1 | 9/2010 |
| WO | 2010107358 A1 | 9/2010 |

OTHER PUBLICATIONS

3GPP TS 36.321 V8.6.0 3rd Generation Partnership Project; Technical Specification Group Radio Access Network; Evolved Universal Terrestrial Radio Access (E-UTRA) Medium Access Control (MAC) protocol specification (Release 8), Jun. 2009.

3GPP TS 36.331 V8.6.0 3rd Generation Partnership Project; Technical Specification Group Radio Access Network; Evolved Universal Terrestrial Radio Access (E-UTRA) Radio Resource Control (RRC); Protocol specification (Release 8), Jun. 2009.

3GPP TR 36.902 V1.0.0 3rd Generation Partnership Project;Technical Specification Group TSG RAN Evolved Universal Terrestrial Radio Access Network (E-UTRAN); Self-configuring and self-optimizing network use cases and solutions (Release 8), Feb. 2008.

Ericsson: "RACH Optimization Function", 3GPP TSG RAN WG3 Meeting #63bis, R3-090825, Mar. 23-26, 2009, pp. 1-4, XP050341202, Seoul, South Korea.

QUALCOMM Europe: "Framework for UE SON Reports", 3GPP TSG RAN WG3 & SA WG5, S5-090017, Jan. 12-13, 2008, pp. 1/5-5/5, XP002588155, Sophia Antipolis, France.

NTT DOCOMO, KPN, T-Mobile, Fujitsu, NEC: "L1 eNB measurements on PRACH resources", 3GPP TSG RAN WG1 Meeting #51bis, R1-080159, Jan. 14-18, 2008, pp. 1-4, XP050108689, Seville, Spain.

QUALCOMM Europe: "Framework for RACH Parameter Optimization", 3GPP TSG RAN WG3, R3-090697, Mar. 23-26, 2009, pp. 1/3-3/3, XP050341084, Seoul, Korea.

* cited by examiner

*Primary Examiner* — Chuong A Ngo
(74) *Attorney, Agent, or Firm* — Winston Hsu; Scott Margo

(57) ABSTRACT

A method of random access channel optimization for a mobile device in a wireless communication system is disclosed. The method includes the following steps. Firstly, the mobile device receives a message including an indicator for the RACH optimization from a network of the wireless communication system. Afterwards, in response to the message, the mobile device sends a RACH measurement report including RACH parameters, used for the network to perform the RACH optimization, to the network.

14 Claims, 3 Drawing Sheets

METHOD OF RANDOM ACCESS CHANNEL OPTIMIZATION AND RELATED COMMUNICATION DEVICE

CROSS REFERENCE TO RELATED APPLICATIONS

This application claims the benefit of U.S. Provisional Application No. 61/218,428, filed on Jun. 19, 2009 and entitled "Network initiated RACH procedure" the contents of which are incorporated herein in their entirety.

BACKGROUND OF THE INVENTION

1. Field of the Invention

A method utilized in a wireless communication and related communication device are disclosed, and more particularly, to a method of random access channel optimization in a wireless communication system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

In LTE system, random access channel (RACH) is an uplink channel, and is used to transfer control information from a UE to the network, e.g. for initial access to set up a connection or for location area updates. It can also be used for the transport of user data packets. Since the RACH channel is a contention based channel where several users might access the same resource, the RACH configuration has critical impacts to system performance. For example, the RACH collision probability is significantly affected by the RACH configuration, thereby making this a critical factor for call setup delays, data resuming delays from the uplink unsynchronized state, and handover delays. In addition, the RACH configuration also affects the call setup success rate and handover success rate.

In order to improve the system performance, RACH optimization functionality is introduced in the LTE system. The network may perform the RACH optimization for optimizing the RACH configuration, thereby increasing efficiency as well as improving the system performance. In addition, a random access procedure can be performed for collecting RACH parameters, so that the network can adjust the RACH configuration according to the collected RACH parameters. However, the random access procedure can be triggered only by a Physical Downlink Control Channel (PDCCH) order or by a Medium Access Control (MAC) layer of the UE. Generally, the random access procedure triggered by the PDCCH order is used for a purpose of cell radio network temporary identifier (C-RNTI) update, and the random access procedure triggered by the MAC layer is used for a purpose of data transmission. As can be seen, both cases are not for the purpose of RACH optimization. When the network wants to perform the RACH optimization, all it can do is to wait the UE performs the random access procedure for RACH parameter collection. This may cause that the network is unable to perform the RACH optimization timely, thereby affecting system performance.

Moreover, after the RACH optimization is successfully performed, the optimized RACH configuration shall meet certain requirement, e.g. an average number of the PREAMBLE_TRANSMISSION CONUNTER should less than 20. If the optimized RACH configuration is not met the requirement, the network shall perform the RACH optimization again. However, there is no clearly specification for the network to ask the UE to perform the random access procedure for RACH parameter collection. Thus, the network may not obtain proper information for the RACH optimization.

In addition, the UE stores the collected RACH parameters after performing the random access procedure, and waits for the network to request the collected results for RACH optimization. However, how the network requests the collected results is not clearly defined, thereby affecting process of the RACH optimization. Moreover, how long the UE should keep information of the collected results is never concerned.

SUMMARY OF THE INVENTION

A method of random access channel optimization in a wireless communication system is disclosed to enhance random access chancel optimization.

A method of random access channel (RACH) optimization for a mobile device in a wireless communication system is disclosed. The method comprises at least the step of receiving a message including an indicator for the RACH optimization from the network and the step of in response to the message, sending a RACH measurement report including RACH parameters, used for the network to perform the RACH optimization, to the network.

A communication device of a wireless communication system comprising a network is disclosed. The communication device comprises means for receiving a message including an indicator for RACH optimization from the network, and means for, in response to the message, sending a RACH measurement report including RACH parameters, used for the network to perform the RACH optimization, to the network.

These and other objectives of the present disclosure will no doubt become obvious to those of ordinary skill in the art after reading the following detailed description of the preferred example that is illustrated in the various figures and drawings.

DETAILED DESCRIPTION

Figure 1:
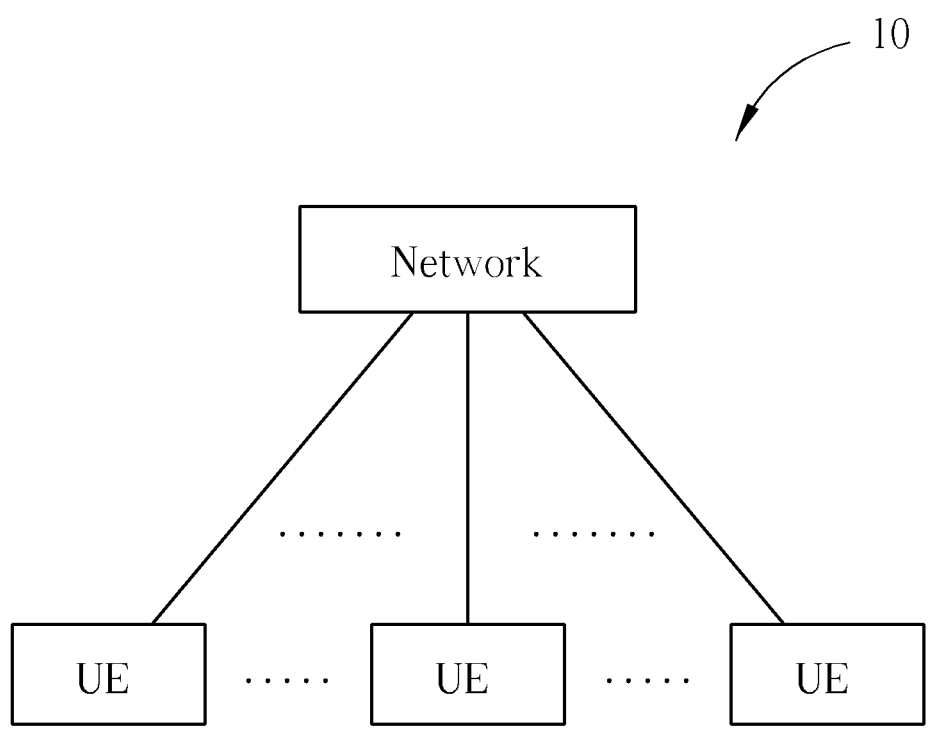
FIG. 1 illustrates a schematic diagram of an exemplary wireless communication system.

Please refer to FIG. 1, which illustrates a schematic diagram of a wireless communication system 10 according to an example. Briefly, the wireless communication system 10 is composed of a network and a plurality of mobile devices. The wireless communication system 10 can be a UMTS (Universal Mobile Telecommunications System), an LTE (long-term evolution) system or any other similar network system. In the LTE system, the network can be referred as a EUTRAN (evolved-UTRAN) comprising a plurality of eNBs or a core network entity (e.g. Mobility Management Entity called MME), whereas the mobile devices are referred as to user equipments (UEs). The UEs can be devices such as mobile phones, computer systems, etc. This terminology will be used throughout the application for ease of reference. However, this should not be construed as limiting the disclosure to any one particular type of network. In some examples, the network and the UE may be seen as a transmitter or receiver according to transmission direction, e.g., for uplink (UL), the UE is the transmitter and the network is the receiver, and for downlink (DL), the network is the transmitter and the UE is the receiver.

Figure 2:
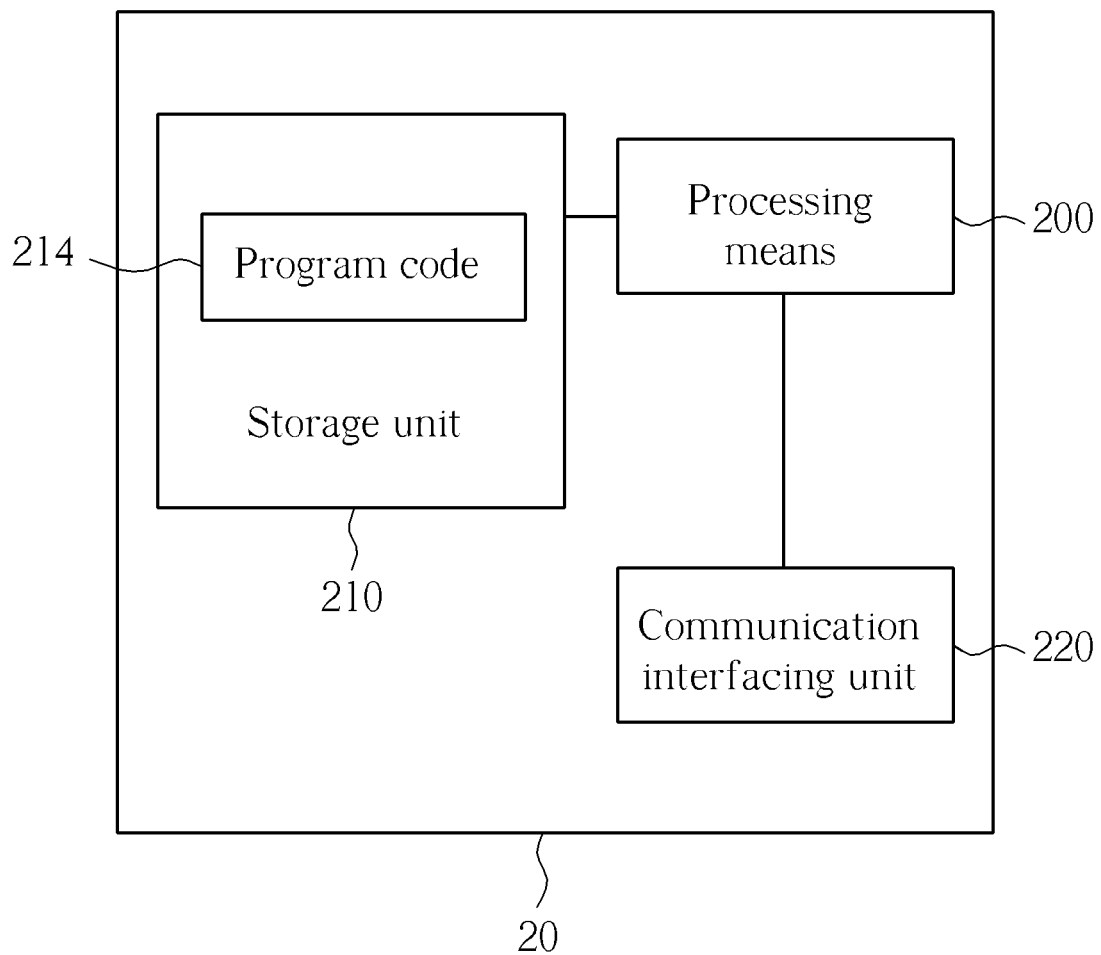
FIG. 2 illustrates a schematic diagram of an exemplary communication device.

FIG. 2 illustrates a schematic diagram of an exemplary communication device 20. The communication device 20 can be the mobile device shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

The program code 214 includes program code of a Medium Access Control (MAC) layer and program code of a radio resource control (RRC) layer. The program code of the MAC layer can manage a random access procedure for collecting random access channel (RACH) parameters. In addition, the program code of the RRC layer is used for RRC connection management, measurement reporting and control, and radio bearer (RB) control responsible for generating or releasing radio bearers (RBs). The RRC layer obtains the collected RACH parameters from the MAC layer, and then generates a RACH measurement report based on the collected results. After that, the measurement report is sent to the network (e.g. E-UTRAN). In addition, the RRC layer includes a RRC_CONNECTED state capable of using the RBs, and a RRC_IDLE state incapable of using the RBs.

Figure 3:
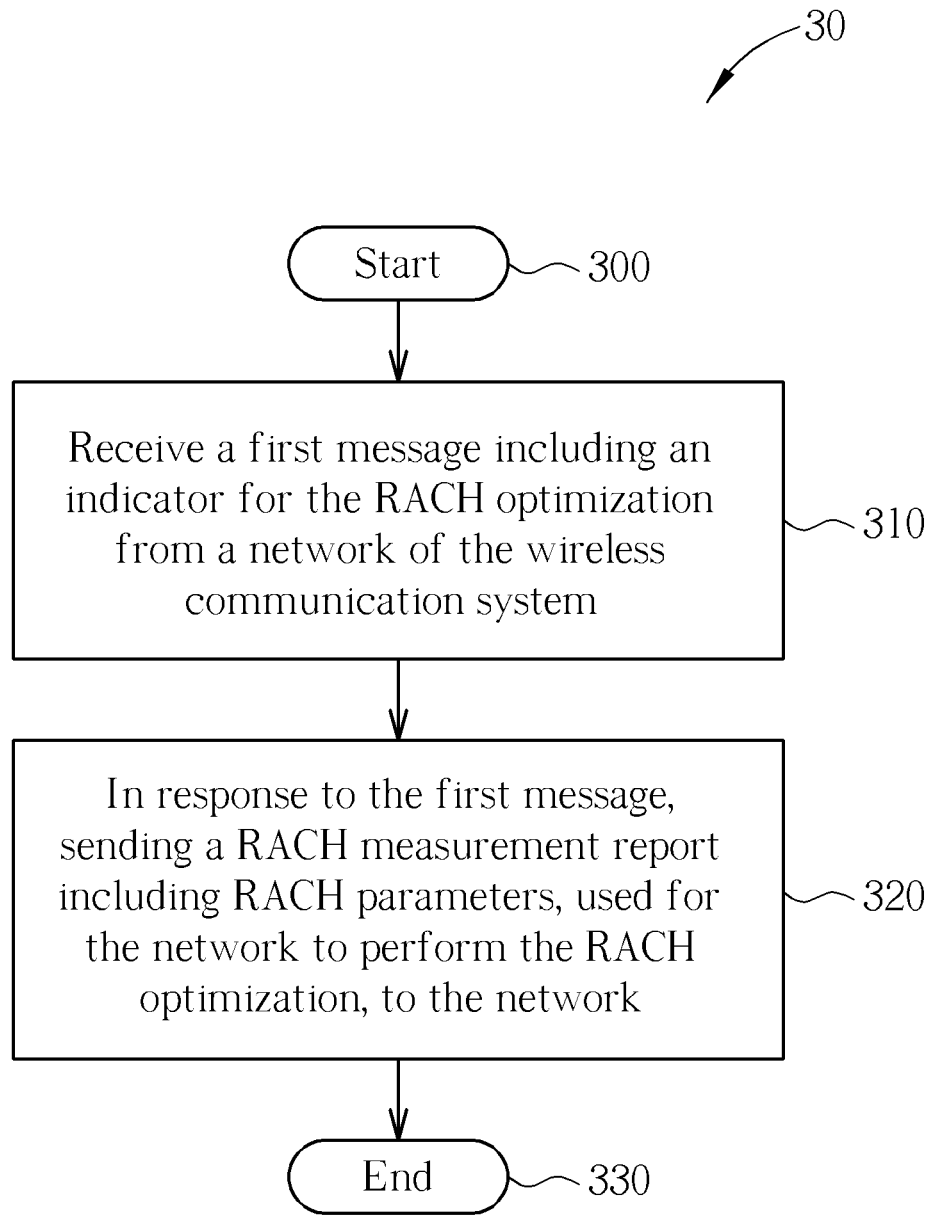
FIG. 3 is a flowchart of an exemplary process according to the present disclosure.

Please refer to FIG. 3, which illustrates a flowchart of an exemplary process 30. The process 30 is utilized in a UE for handling random access channel optimization, where the UE can be the communication device 20 of FIG. 2. The process 30 may be compiled into the program code 214 and includes the following steps:

Step 300: Start.

Step 310: Receive a first message including an indicator for the RACH optimization from a network of the wireless communication system.

Step 320: In response to the first message, sending a RACH measurement report including RACH parameters, used for the network to perform the RACH optimization, to the network.

Step 330: End.

According to the process 30, the UE sends the RACH measurement report for RACH configuration optimization to the network after the first message is received from the network. In other words, the network requests the UE to transmit the RACH measurement report by sending the first message to the UE. The first message may be a paging message, a physical downlink control channel (PDCCH) signal (e.g. PDCCH order), a PDCCH indicator (e.g. a new RNTI associated with PDCCH, "Rachson-RNTI"), a radio bearer configuration message (e.g. "RRCConnectionReconfigura-tion"), or a message dedicated for initiation of the random access procedure (e.g. "RRCRachMeasurementRequest").

Please note that, the network can determine which message shall be used according to a RRC status (e.g. the RRC_CONNECTED state or the RRC_IDLE state) of the UE. For example, the network sends the paging message or the PDCCH indicator to the UE for the RACH measurement report request when the UE is in the RRC_IDLE state, whereas the network sends the "RRCConnectionReconfiguration" message, "RRCRachMeasurementRequest" message, or the PDCCH order to the UE for the RACH measurement report request when the UE is in the RRC_CONNECTED state. Moreover, the network may include a field (e.g. a specific filed, "rachson-Indication"), an information element (IE), or an indicator in the paging message. Therefore, when the UE receives the paging message including the field, the IE, or the indicator, the UE can identify that the paging message is used for the purpose of the RACH optimization, thereby sending the RACH measurement report to the network.

Please note that, the network may allocate dedicated preamble information in the abovementioned field of the paging message, so as to request a certain type of the RACH measurement report from the UE.

Moreover, the RACH measurement report includes the RACH parameters collected via the random access procedure. The UE may perform the random access procedure to collect the RACH parameters after receiving the first message from the network. After that, the UE includes the collected RACH parameters in the RACH measurement report, and then sends the RACH measurement report to the network. On the other hand, if the UE has the RACH parameters already (e.g. collected via a previous random access procedure), the UE may not perform the random access procedure to collect the RACH parameters after receiving the first message from the network, and will send the RACH measurement report including the previously collected RACH parameters to the network.

For the RACH measurement report transmission, the UE may generate a second message including the RACH measurement report in response to the message received from the network, and then sends the second message to the network. Taking a UE in the RRC_IDLE state as an example, the UE may perform the random access procedure to collect the RACH parameters for RACH optimization when receiving the paging message including the "rachson-Indication" field, from the network. After the RACH parameters are collected via the random access procedure, the UE generates the RACH measurement report including the collected RACH parameters, and includes the RACH measurement report in a message 3 of the random access procedure. After that, the UE sends the message 3 to the network, so that the network can perform the RACH optimization according to the RACH measurement report included in the message 3. Moreover, after the message 3 is sent to the network, the UE may enter the RRC_IDLE state because initiation cause of the random access procedure is for the RACH optimization.

In some examples, the message 3 may be a RRC connection establishment request message or a dedicated message for the RACH measurement report (e.g. "RachMeasurementReport"). Therefore, the UE may include the RACH measurement report in the RRC connection establishment request message or the "RachMeasurementReport" message. Alternatively, the UE may include the RACH measurement report in RRC connection setup complete message following the RRC connection establishment request message. Because the connection establishment cause is for the RACH optimization, after the network obtains the RACH measurement report from the RRC connection establishment request message, the network sends RRC connection establishment reject message to the UE. Thus, the UE does not enter the RRC_CONNECTED state, but enters the RRC_IDLE state, thereby avoiding radio resource waste. Briefly, the UE shall maintain in the same RRC state after the RACH measurement report is sent to the network.

In addition to the RRC connection establishment reject message, in some examples, the UE may initiate a timer for the random access procedure. Thus, when the UE in the RRC_IDLE state receives the paging message and performs the random access procedure for the RACH optimization, the UE enters the RRC_IDLE state after the timer expires, so as to return to the original RRC state of the UE. A value of the timer is obtained from the paging message, system information broadcasted by the network, or a default value stored in the UE.

On the other hand, taking a UE in the RRC_CONNECTED state as an example, the UE may perform the random access procedure for collecting the RACH parameters when receiving the "RRCConnectionReconfiguration" message or the "RRCRachMeasurmentRequest" message, from the network. After the RACH parameters are collected via the random access procedure, the UE generates the RACH measurement report including the collected RACH parameters, and includes the RACH measurement report in "RRCConnectionReconfigurationComplete" message responding to the "RRCConnectionReconfiguration" message, or in "RRCRachMeasurementResponse" message responding to the "RRCRachMeasurmentRequest" message. By sending the "RRCConnectionReconfigurationComplete" message or the "RRCRachMeasurementResponse" message to the network, the network can perform the RACH optimization according to the RACH measurement report included in this message.

Moreover, taking another example, the UE in the RRC_CONNECTED state performs the random access procedure for collecting the RACH parameters when receiving the PDCCH order from the network. After the RACH parameters are collected via the random access procedure, the UE generates the RACH measurement report including the collected RACH parameters, and includes the RACH measurement report in the message 3 of the random access procedure. Therefore, the network can perform the RACH optimization according to the RACH measurement report in the message 3.

Please note that, in the abovementioned examples, the UE may delete the RACH measurement report after the RACH measurement report is sent to the network.

Furthermore, the UE may determine whether to send the RACH measurement report to the network according to the indicator including in the first message. Take a UE performing the random access procedure as an example. In order to request the RACH measurement report from the UE, the network may include an indicator in the message 2 of the random access procedure. In this embodiment, the message 2 is a message generated by the network for responding to a request for random access procedure generated by the UE. The random access procedure may be trigger by UE itself (e.g. due to a RRC connection establishment/reestablishment procedure, or a handover procedure), or any of the abovementioned indications. Please note that, the network includes the indicator in the message 2 of the random access procedure triggered by any of the abovementioned reason, so as to increase signaling usage efficiency. Therefore, the UE sends the RACH measurement report to the network after receiving the message 2 including the indicator. The RACH measurement report may be included in the message 3 or in the RRC message. The detailed description can be referred from above, so it is not given herein. Moreover, the network may indicate to the UE how to handle the RACH measurement report via the indicator included in the message 2. For example, the network sets the indicator included in the message 2 to 'TRUE'. Thus, when the UE receives the message 2 of the random access, the UE sends the RACH measurement report to the network for the RACH optimization. On the other hand, the network may set the indicator to 'FALSE'. Thus, when the UE receives the message 2, the UE deletes the RACH measurement report. As abovementioned, according to the indicator included in the message 2, the UE may determine whether to send the RACH measurement report to the network or to delete the RACH measurement report. Please note that, the abovementioned indicator is not limited to be included in the message 2 of the random access procedure and may be included in any specific message sent to the UE from the network.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the exemplary method and means are provided to enhance the RACH optimization. Thus, when the network attempts to perform the RACH optimization, the network can request the UE to perform the random access procedure, thereby acquiring required information for the RACH optimization.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method of random access channel (RACH) optimization for a mobile device in a wireless communication system, the method comprising:
   receiving a first message including an indicator for the RACH optimization from a network of the wireless communication system; and
   in response to the first message, sending a RACH measurement report including RACH parameters, used for the network to perform the RACH optimization, to the network, comprising:
   sending the RACH measurement report if the mobile device is in a radio resource control (RRC) idle state, and the first message is of a first type; and
   sending the RACH measurement report if the mobile device is in a RRC connected state, and the first message is of a second type.

2. The method of claim 1 further comprising:
performing a random access procedure for collecting the RACH parameters.

3. The method of claim 2 further comprising:
storing the RACH parameters.

4. The method of claim 2, further comprising:
initiating a timer for the random access procedure when the mobile device is in a RRC idle state; and
entering the RRC idle state when the timer is expired, wherein a value of the timer is obtained from the first message, system information broadcasted by the network, or a value that has been stored in the mobile device before the first message is received.

5. The method of claim 1 further comprising:
deleting the RACH measurement report after the step of sending the RACH measurement report to the network.

6. The method of claim 1, wherein the step of sending the RACH measurement report including the RACH parameters to the network comprises:
determining whether to send the RACH measurement report to the network according to the indicator; and
when the indicator is set to a first value, sending the RACH measurement report to the network.

7. The method of claim 6, further comprising:
when the indicator is set to a second value, deleting the RACH measurement report.

8. A communication device of a wireless communication system comprising a network, the communication device comprising:
means for receiving a first message including an indicator for RACH optimization from the network; and
means for, in response to the first message, sending a RACH measurement report including RACH parameters, used for the network to perform the RACH optimization, to the network, wherein the means for sending the RACH measurement report comprises:
means for sending the RACH measurement report if the mobile device is in a radio resource control (RRC) idle state, and the first message is of a first type; and
means for sending the RACH measurement report if the mobile device is in a RRC connected state, and the first message is of a second type.

9. The communication device of claim 8, further comprising:
means for performing a random access procedure for collecting the RACH parameters.

10. The communication device of claim 9, further comprising:
means for storing the RACH parameters.

11. The communication device of claim 9, further comprising:
means for initiating a timer for the random access procedure when the communication device is in a RRC idle state; and
means for entering the RRC idle state when the timer is expired, wherein a value of the timer is obtained from the first message, system information broadcasted by the network, or a value that has been stored in the communication device before the first message is received.

12. The communication device of claim 8, further comprising:
means for deleting the RACH measurement report after the RACH measurement report is sent to the network.

13. The communication device of claim 8, further comprising:
means for determining whether to send the RACH measurement report to the network according to the indicator; and
when the indicator is set to a first value, the RACH measurement report is sent to the network.

14. The communication device of claim 13, further comprising:
when the indicator is set to a second value, the RACH measurement report is deleted.

* * * * *